Dec. 1, 1942.   J. A. WORTHINGTON   2,303,417
STEAM TRAP
Filed Oct. 24, 1941

James A. Worthington
INVENTOR

BY Arthur F. Davis
ATTORNEY

Patented Dec. 1, 1942

2,303,417

UNITED STATES PATENT OFFICE 2,303,417

STEAM TRAP

James A. Worthington, near Sheffield, Ala.

Application October 24, 1941, Serial No. 416,387

2 Claims. (Cl. 236—56)

(Granted under the act of March 3, 1883, as amended April 30, 1928; 370 O. G. 757)

The invention herein described may be manufactured and used by or for the Government for governmental purposes without the payment to me of any royalty thereon.

This invention relates to apparatus for separating condensate from vapor and more particularly to a trap for separating water condensed from steam.

It has heretofore been the general practice to employ float traps with automatic air venting, bucket traps with or without auxiliary air venting, and thermostatic valves utilized as steam traps. However, float traps and bucket traps have internal moving parts and internal valves which frequently cause operating difficulties and in some instances complete breakdown, while thermostatic valves frequently give valve seat trouble due to incessant operation and inability to eliminate scale and foreign matter.

In the present invention the objections above outlined are eliminated and it is the principal object of this invention to provide a steam trap in which there are no floats, internal valves, or other internal moving parts in the trap chamber and which has a thermally responsive valve susceptible to intermittent operation and, accordingly, long life. Another object of this invention is to provide a condensate trap which will open automatically to permit escape of condensate, but which will close automatically when vapor follows the condensate discharged therefrom. Other objects of this invention include the provision of a condensate trap which is simple in construction, economical to manufacture, and reliable in performance.

I have discovered a vapor trap, adapted to separate condensate therefrom, having in combination a condensate receiving chamber, a discharge passage in communication with said chamber, a thermally responsive valve in communication with said discharge passage, and means for maintaining a substantially balanced vapor pressure between the chamber and the discharge passage, said means being elevated relative to the position of said thermally responsive valve.

In the accompanying drawing, which forms a part of the specification and wherein reference symbols refer to like parts wherever they occur, Fig. 1 is a diagrammatic view of one form of apparatus for the embodiment of the invention;

Figure 1:
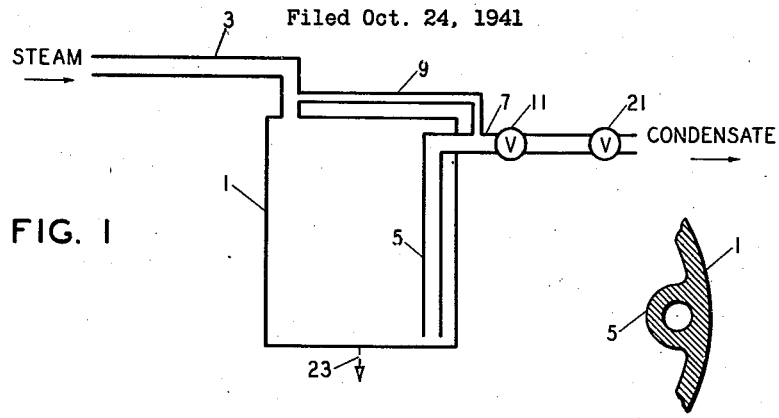
Figure 4:
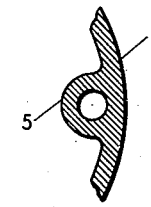
Fig. 4 is a horizontal sectional view taken on line 4—4 of Fig. 3.
Figure 2:
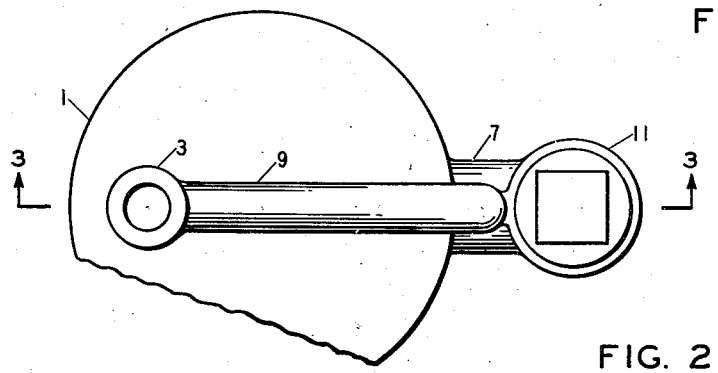
Fig. 2 is a fragmentary plan view of a steam trap constructed in accordance with the invention.
Figure 3:
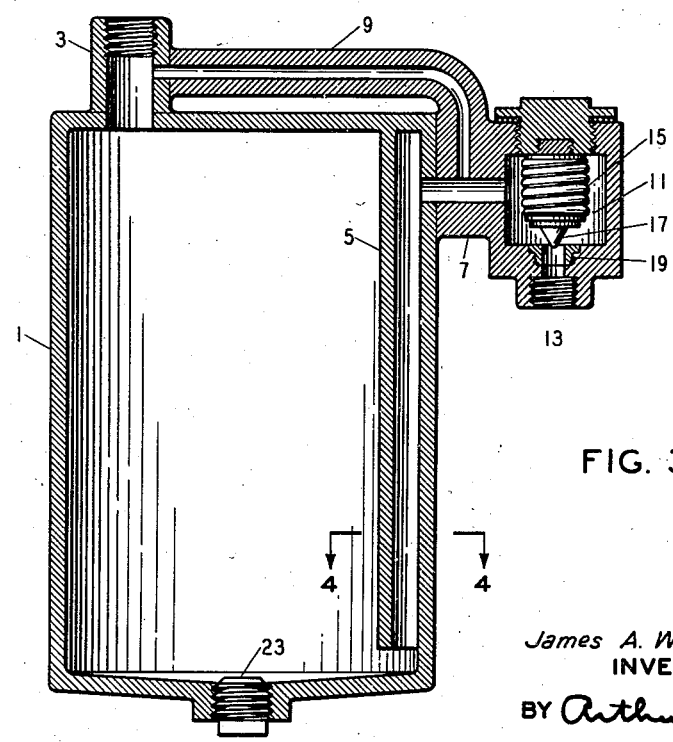
Fig. 3 is a vertical sectional view taken on line 3—3 of Fig. 2.

In Figs. 1 to 4, inclusive, chamber 1 has a steam inlet 3 in the top thereof and has a vertical discharge tube 5 disposed therein. The lower end of the discharge tube 5 is in proximity to the bottom of the chamber 1 and the upper end is in communication with a horizontal discharge tube 7. A by-pass tube 9 extends from the steam inlet 3 to the horizontal discharge tube 7. A thermally responsive valve 11 which has a condensate outlet 13 is connected to the discharge tube 7. In starting operation, steam from steam inlet 3 enters chamber 1 forcing the air out of the chamber and associated passages. When the steam contacts the thermostatic element 15 within the valve 11, the thermostatic element 15 expands, causing the valve 17 to engage its seat 19, thereby closing the trap. The trap will remain closed until condensate has filled the chamber 1 and the discharge tube 5 to a height above the horizontal discharge tube 7. When the condensate has risen above tube 7, the steam ceases to contact the thermostatic element 15 as the condensate has displaced the steam and, due to the lower temperature of the condensate, the thermostatic element 15 contracts, thereby opening the trap. The trap will remain open and discharge the condensate until the chamber 1 has been emptied through discharge tube 5 to a level corresponding to the bottom of the discharge tube. Steam will not pass through tube 9 while the condensate is being discharged through the discharge tube 5 since the system is under balanced pressure. After the condensate has been discharged, steam will pass from chamber 1 through discharge tube 5 and tube 9, causing the trap to close and remain closed until condensate again fills the chamber, as before described, at which time the condensate will again be discharged. By use of a check valve 21, the trap will discharge against a head corresponding to the steam pressure on the system. Sediment is removed, when necessary, through drain plug 23.

It is evident that there are numerous factors which will influence conditions for the most satisfactory operation of my apparatus, the actual limits of which cannot be established except by a detailed study of each type of condensate separation to which it will be applied.

Since the application of the invention is of special utility in connection with the removal of condensate and air from steam lines generally, this particular embodiment has been selected to explain its many advantages. It will be understood, however, that this particular use is not necessarily the limit of its practical application as it may be used for removing condensate from all types of steam-heated equipment, such as evaporators, coils, kettles, heaters, steam mains, etc. In this connection mention will be made of the possibility of using a relatively large chamber in combination with a small thermostatic valve. The valve should be only large enough to discharge at a rate in excess of the maximum condensation rate. With this combination fatigue of the thermostatic valve is greatly reduced and the valve is fully open for a much longer time when connected to the chamber than when connected directly to the heating system, thus allowing a free passage of scale and foreign matter.

It will be seen, therefore, that this invention actually may be carried out with a number of variations without departing from its spirit and scope.

I claim:

1. A steam trap having in combination (a) a chamber, (b) an inlet for condensate and steam in the top of said chamber, (c) a vertical condensate discharge passage in said chamber having its lower terminus in proximity with the bottom of said chamber, (d) a horizontal condensate discharge passage intersecting said vertical passage, (e) a communicative passage between said inlet and said horizontal passage at an elevation above that of said horizontal passage, and (f) a thermally responsive valve in communication with said horizontal passage.

2. A vapor trap, adapted to separate condensate therefrom, having in combination (a) a condensate receiving chamber, (b) a discharge passage in communication with said chamber, (c) a thermally responsive valve in communication with said discharge passage, and (d) means for maintaining a substantially balanced vapor pressure between the chamber and the discharge passage, said means being elevated relative to the position of said thermally responsive valve.

JAMES A. WORTHINGTON.